Oct. 9, 1928.
D. E. ROSS
1,687,258
PROCESS OF MAKING STEERING GEAR ACTUATING MEMBERS HAVING VARYING SPIRAL GROOVES
Filed Dec. 31, 1923  2 Sheets-Sheet 1
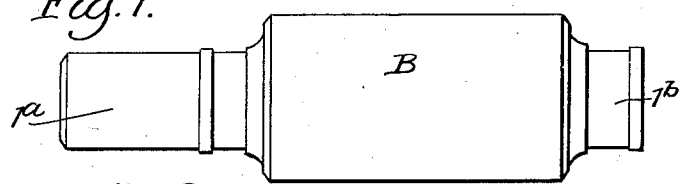
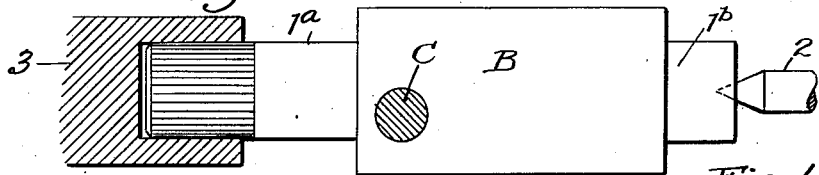
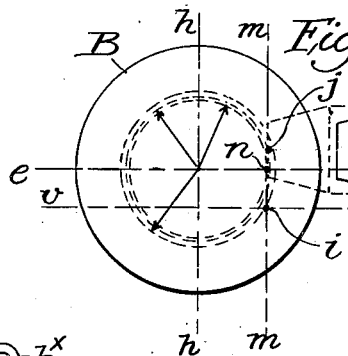
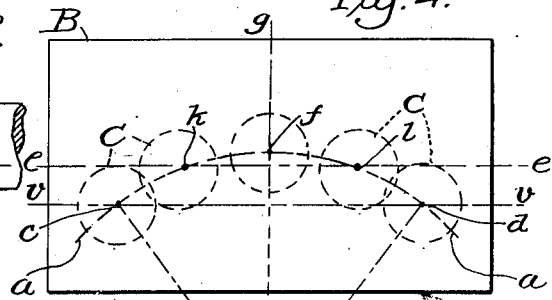
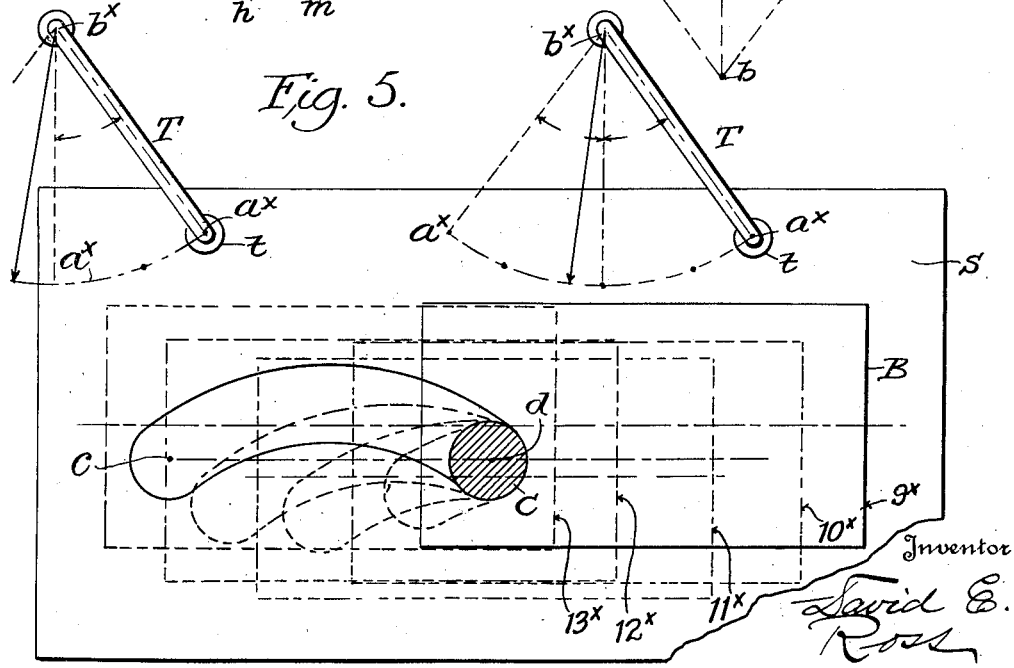

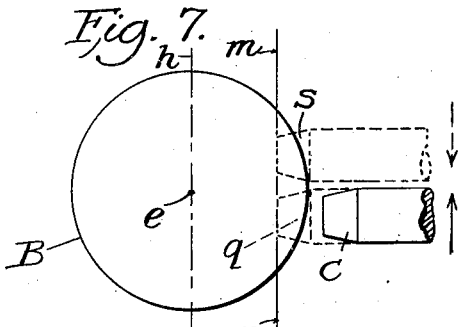
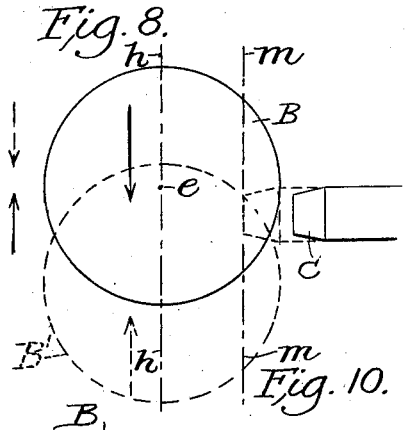
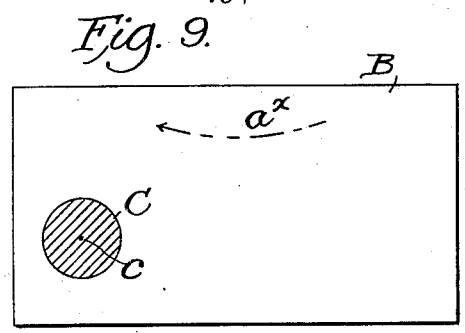
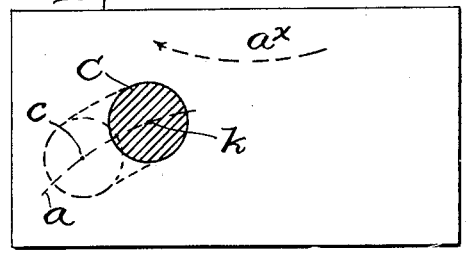
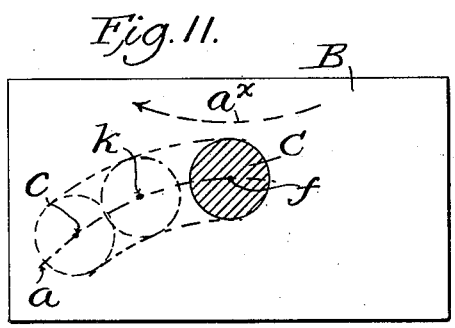
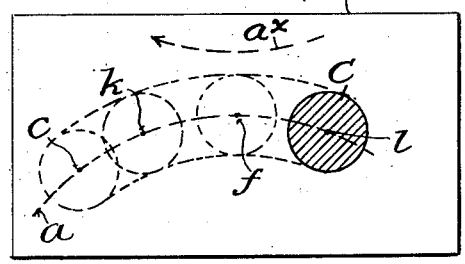
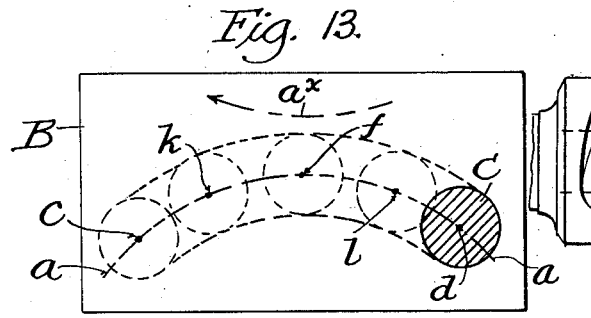
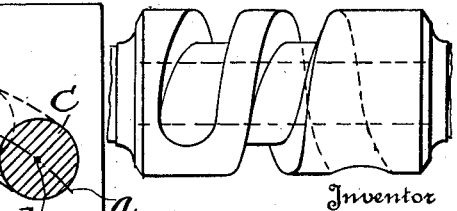

Patented Oct. 9, 1928.

1,687,258

UNITED STATES PATENT OFFICE.

DAVID E. ROSS, OF LA FAYETTE, INDIANA, ASSIGNOR TO ROSS GEAR & TOOL COMPANY, OF LA FAYETTE, INDIANA, A CORPORATION OF INDIANA.

PROCESS OF MAKING STEERING-GEAR-ACTUATING MEMBERS HAVING VARYING SPIRAL GROOVES.

Application filed December 31, 1923. Serial No. 683,679.

This invention is a novel method of and apparatus for manufacturing steering gear actuating members having varying helical grooves of the character shown and described in my application for patent on steering gear filed Sept. 5, 1922, Serial No. 586,145.

Such actuating member is connected to the "steering shaft", and the varying helical groove in the member is engaged by a pin on an arm on the "rocker shaft" lying at right angles to the steering shaft and when the parts are in normal straight ahead position the pin is at the longitudinal center of the length of the groove in the actuating member. Then when such actuating member is turned on its axis the related rocker shaft is rocked by the movement of the pin from the center of the groove toward either end thereof with an accelerating motion; and if the actuating member is then reversed the pin will be moved back toward the longitudinal center of the groove with a gradually decreasing motion.

In such steering gear the rocker of the steering shaft is at right angles to the axis of the actuating member and consequently the pin on the rocker shaft arm, engaging the groove in the actuating member, must traverse an arc in passing from one extreme of its movement to the other, or in moving from one end of the groove in the actuating member to the other; and in traversing this arc the pin will necessarily be constantly varying in distance from the axis of the actuating member. The usual methods of and machines for cutting spiral threads or grooves will not cut a groove by which this arcuate movement of the pin can be compensated for; nor make a groove which will provide for a continuous uniform engagement between the pin and the sides of the varying helical groove. Such varying helical groove has a pitch of approximately 90 degrees at the center of its length, (or point where the steering shaft is in normal "straight ahead" running position of the gear) and progressively decreases in pitch from such central point toward each end thereof, such varying groove causing an increasingly accelerated movement of the rocker shaft as the pin or arm thereon moves from a position at the center of such groove toward either end thereof, and vice versa, as more fully explained in my aforesaid application.

Such varying helical groove in such actuating member has to be made with exceeding nicety and accuracy; and my present invention includes the novel method of, and means whereby, after a blank for an actuating member has been shaped to the proper size and form such variable helical groove may be accurately cut therein.

The novel method may be briefly summarized as consisting in (1) mounting a cylindrical blank so that it may be revolved on its axis opposite a cutter, the axis of which is perpendicular to a plane containing the axis of the blank; (2) producing a relative movement between the blank and the cutter whereby the cutter location always lies in some plane parallel to the said plane containing the axis of the blank so that this relative movement produces an arc with respect to the axis of the blank; (3) rotating the cutter and decreasing the distance between the cutter and the blank whereby the cutter is caused to sink into the blank; and (4) simultaneously rotating the blank into which the rotating cutter has been sunk and producing the described relative movement of the blank and cutter thereby producing in the blank a spiral groove of varying pitch and varying depth.

The novel method may be carried out by various mechanical means and apparatus the essential features of which are illustrated diagrammatically in the drawings; sufficient being shown to enable others skilled in the art to understand and embody the invention in various forms of practical machines.

I will explain the invention with reference to the accompanying drawing which illustrates the method and various mechanically equivalent means for producing such actuating members by said method; and in the claims I have summarized the essentials of the invention, both method and apparatus, for which protection is desired.

In said drawings:

Figure 1 is a view of a blank for a complete actuating member ready for grooving.

Fig. 2 is a diagrammatic view of a blank and a cutter positioned relative to the blank for the grooving operation.

Fig. 3 is a diagrammatic end elevation of the blank and side view of a cutter illustrating different relative positions thereof.

Fig. 4 is a diagrammatic view illustrating different relative positions of the blank and cutter, in cases where the cutter is moved on an arc relative to the blank during the cutting operation.

Fig. 5 is a diagrammatic view illustrating different relative positions of the blank and cutter in cases where the blank is moved on an arc relative to the cutter during the cutting operation.

Fig. 6 is a partial view of the completed actuating member showing the varying spiral groove therein.

Fig. 7 is a diagrammatic view illustrating another mode of moving the cutter relative to the blank during the cutting operation to produce the desired effect.

Fig. 8 is a diagrammatic view illustrating another mode of moving the blank relative to the cutter during the cutting operation to produce the desired effect.

Figs. 9, 10, 11, 12 and 13 are diagrammatic views illustrating the relative positions of the cutter and blank at different stages of the cutting operation in any of the various mechanical arrangements which may be employed for operating the blank and cutter in accordance with my novel method.

In producing the said steering gear actuating members having varying helical grooves in accordance with my method the steps are briefly as follows: I first form a cylindrical blank B, Fig. 1, and then mount such blank fixedly or movably, so that it may be rotated on its longitudinal axis opposite a cutter C which is fixedly or movably mounted opposite the blank so that the cutter may be rotated on its longitudinal axis, and rotate the cutter by suitable means; then I relatively move the blank B and cutter C to cause the cutter to enter the blank to the desired depth; then the blank is rotated during the simultaneous relative movement of blank and cutter but I so limit or proportion the relative movements of blank and cutter that the cutter will describe an arc relative to the axis of the blank and perpendicular to the axis of the cutter; so that the groove cut in the blank is caused to assume a spiral form of variable pitch as the cutter traverses the arc; and this will also cause the variable groove cut in the blank to be of a variable depth.

The desired relative movements of the blank and cutter can be produced by various mechanical means, as, for example, (1) fixedly mounting a blank so that it can be rotated opposite a movable mounting of a revolving cutter; (2) movably mounting the blank so that it can be rotated opposite a fixed mounting of a revolving cutter; (3) movably mounting a revolving blank opposite a movable mounting of a revolving cutter.

The blank B may be made of suitable steel and should have a truly cylindrical body portion of the proper length and diameter, and is preferably provided with trunnions $1^a$, $1^b$ at its opposite ends (see Fig. 1) so that when such a blank is placed in a suitable machine with its trunnion $1^a$ engaged with a rotatable head 3 and its trunnion $1^b$ engaged with a center 2 it will be properly positioned in the machine and truly and accurately centered, as indicated in Fig. 2, and can be caused to rotate by and with the head 3.

The cutter should be made of high grade cutting steel and preferably has a milling cutter head C which preferably exactly corresponds in exterior form to a cross section of the groove to be cut in the actuating member. This cutter is mounted to rotate on its axis, which is perpendicular to a plane containing the axis of the blank B. The cutter is also longitudinally movable relatively to the blank, when the latter is in condition for operation.

After a blank B is properly mounted between the centers 2 and 3 the cutter C is revolved, and the blank B is held stationary until the cutter head has been entered to the proper depth into the blank. To facilitate entering the cutter into the plank B a suitable hole may be drilled in the blank before it is placed between the centers.

When the cutter has been properly entered into the blank the cutter is continuously rotated at the proper speed, and the blank is then rotated. The cutter is driven continuously at the proper speed; and the blank is turned very slowly, at a predetermined speed, and due to the resultant effect of the relative motions of the cutter and blank the cutter head cuts a helical groove in the cylindrical blank B as the cutter moves from the point $c$ to the point $d$ (Fig. 4), and the pitch of this helical groove is continually varied from center $f$ to each end $c$, $d$, by the relative arcuate movement of the cutter and blank.

In the construction indicated in Fig. 4 the cutter is also bodily movable laterally on an arc indicated by the line $a$—$a$ in Fig. 4, whose center is at $b$ which is the axial line of the rocker shaft of the complete steering gear. The construction is such that at the two extremes of its arcuate lateral movement, indicated at $c$ and $d$ in Fig. 4, the axis of the cutter lies below the plane of the axis $e$ of the blank B, as indicated in Figs. 3 and 4. At the center of its arcuate movement (indicated at $f$ in Fig. 4) the axis of the cutter C lies above the plane of the axis $e$ of the blank B, as indicated in Fig. 4.

The dotted circles in Fig. 4 (and in Figs. 10–13) illustrate various relative positions of the cutter C and the cam blank during the cutting operation. In Fig. 4 the line $g$—$b$ intersects the center line of the rocker shaft, and indicates the mid position of the arm of the rocker shaft which carries the pin that engages the groove in the complete actuating member.

Fig. 3 illustrates the varying depth of the spiral groove cut in the actuating member when the cutter has no longitudinal movement relative to the blank during the cutting operation. And in practice it is not desirable to have the cutter which makes the finishing cut in the blank have any longitudinal movement during its lateral arcuate movement.

When the cutter is operated to groove the blank as described and indicated the bottom or smaller end of the cutter head C when at its extreme positions $c$, $d$, (Fig. 4) will not cut the bottom of the groove truly parallel to the axis of the blank B, owing to the fact that at such points the cutter head C is operating somewhat off the center (as indicated by the line $v$—$v$, in Figs. 3 and 4). Therefore the bottom of the groove will be slightly deeper at the edge of the cutter nearer the axis of the blank. As indicated in Figs. 3 and 4 the cutter as it moves longitudinally of the blank traverses a plane which is at right angles to the axis $b$ of the rocker shaft, the cutting head C traversing a plane indicated by the line $m$—$m$, Fig. 3, which is parallel with the plane $h$—$h$ containing the axis of the blank. At the extreme ends of the movement of the cutter longitudinally of the blank (in the positions indicated at $c$ and $d$ Figs. 4 and 13) the bottom of the groove is farthest from the center of the cylinder, as indicated at $i$ in Fig. 3. At the central point of its movement indicated at $f$ in Fig. 4 the bottom of the groove is slightly farther away from the axis of the cam than at the points $k$, $l$ as indicated at $j$ in Fig. 3. At the intermediate points $k$ and $l$ (Fig. 4) the cutter head C moving in the plane $m$—$m$ (Fig. 3) crosses the maximum diameter of the cylinder (as indicated by the line $e$—$e$ in Fig. 3) and the bottom of the groove would be nearest the axis of the cam as indicated at $n$ in Fig. 3. In other words the spiral groove cut in the blank is of corresponding depth at the intermediate points $k$, $l$, is of slightly less depth at the center point $f$; and is of the least depth at the extreme points $c$, $d$.

The cutter head C corresponds in contour to the diameter of the pin which is attached to the rocker shaft and engages the groove of the actuating member in the steering gear; and said pin will of course exactly follow the groove made by the cutter; and the pin therefore will be most deeply engaged with the groove at the points $k$, $l$ (Fig. 4), where as a matter of fact the strain would ordinarily be greatest.

Instead of moving the cutter on an arc relative to the blank during the cutting operation, the blank may be moved on an arc relative to the cutter during the cutting operation with identically the same effect.

In the construction illustrated diagrammatically in Figure 5 a blank B, as above described is rotatably mounted upon a movable support S which can be swung on an arc (indicated by lines $a^x$—$a^x$ in Figure 5) corresponding to the arc $a$—$a$ in Fig. 4. The support is also provided with means for rotating the blank as it swings. In the example shown the support S may be caused to move on such arc by links T, which are pivotally connected to the support at $t$ and pivoted to relatively fixed points $bx$.

The cutter C is mounted rotatably opposite the blank and operates thereon substantially as above described, as the blank swings therepast, and suitable means are provided for rotating the cutter and for rotating the blank on its axis and for moving the support S and blank on the arc $a^x$—$a^x$ during the groove cutting operation.

Referring to Fig. 5, the cutter head C is entered into the blank while the latter is stationary and in the position indicated in Fig. 9 and at $9^x$ in Fig. 5; then the blank is swung on an arc to the position shown in Fig. 10 and at $10^x$, Fig. 5. The blank continues on its movement to the position shown in Fig 11 and at $11^x$ in Fig. 5. The cutter has then reached the center of the groove cut in the blank. The blank continues its arcuate movement to the position shown in Fig. 12 and at $12^x$ in Fig. 5; thence on to the position shown in Fig. 13 and at $13^x$ in Fig. 5; these movements produce a true arcuate relative movement of the cutter and blank as indicated in Fig. 5, and in Figs. 9 to 13, and result in producing a true varying helical groove in the blank during such movement.

During the groove cutting operations the blank B is rotated at such a predetermined speed that the helical groove cut in the actuating member (see Fig. 6) has a pitch of practically 90° to the axis of the blank at its center (or where the cutter is at the point $f$, Fig. 4) and the pitch of such groove gradually increases from the center $f$ (see Fig. 4) of the groove to each end thereof, being of the highest pitch at its ends $c$ and $d$. The same result might be produced if a variable rotation was given to the blank and the cutter was moved at uniform speed through its arc, but the rate of feed on the stock would have to be increased to accomplish this; if the starting feed were the maximum the cutter could take, then the feed in mid position would be too great for smooth cutting and might injure the cutting tool. On the other hand, if the feed at start were slow and increased to maximum at center the cutting time would probably be too slow.

If desired the blank B could be mounted to rotate on a fixed axis as indicated in Fig. 7, and the cutter head C mounted to rotate at right-angles to the blank, as described, and also be moved up and down in a plane $m$—$m$ perpendicular to the axis of the cutter and parallel with a plane $h$—$h$ containing the axis of the blank, the cutter being moved during the cutting operation from the position indicated at $q$ to the position indicated at $s$ in Fig. 6 and return. In this case the blank B during the cutting operation should be moved longitudinally, as well as rotated, the simultaneous movements of the cutter and blank causing the cutter to traverse an arc relative to the blank as indicated in Figs. 9 to 13.

As indicated in Fig. 8, the cutter C may be rotated on a fixed axis and also be moved laterally in a plane, and the blank B rotated on its own axis and also moved in a plane $h$—$h$ perpendicular to the axis of the cutter during the cutting operation, from the position indicated in full lines to the position indicated by the dotted line B′ and return; the blank and cutter being so relatively rotated and moved during the cutting operation that the cutter is caused to traverse an arc relative to the blank as indicated in Figs. 9 to 13 during the cutting operation.

Whatever the form of the mechanism employed, it will be seen that in each and every instance the cutter and blank have such relative movements during the cutting operation that the cutter traverses a plane parallel with the axis of the blank, and operates upon the blank in an arc $a$—$a$ (Fig. 4) extending through a plane $m$—$m$ (Fig. 3) parallel with the plane ($h$—$h$, Fig. 3) containing the axis of the blank, and thereby produces in the blank a spiral groove which varies in pitch from the center toward each end thereof. In each instance it will be seen that during the cutting operation the cutter moves on an arc relative to the blank, and in traversing said arc intersects at two points (as $k$ and $l$, Fig. 4), a plane (as $e$—$e$ Fig. 3) extending through the axis of the blank and substantially perpendicular to the plane (as $m$—$m$ Fig. 3) of the arc.

The product will be the same if the cutter travels through an arc relative to the blank, or the blank travels through an arc relative to the cutter; or if both the blank and the cutter have such relative movement that the resultant thereof causes the cutter to operate upon the blank in an arc as indicated in Figs. 4 and 5 and 9 to 13 and such movement can be produced by various mechanical means.

The varying helical groove produced in the actuating member by the aforesaid method and means is shown in Fig. 6. Such helical groove has a pitch of approximately 90 degrees at the center of its length, (or point where the steering shaft is in normal "straight ahead" running position of the gear) and progressively lessens in pitch from such center point toward each end thereof; such varying groove causing an increasingly accelerated movement of the rocker shaft as the arm thereon moves from the position of engagement with the center of such groove toward either end thereof; as more fully explained in my aforesaid application.

It will be seen that in each instance after the blank is formed the grooving operation is carried out by mounting such blank for rotation on its longitudinal axis opposite a cutter whose axis is perpendicular to a plane containing the axis of the blank; then introducing the cutter into the blank and rotating the cutter on its axis to cut a groove in the blank; and then producing during this cutting operation such relative movement between the cutter and the blank that the cutter while traversing a plane ($m$—$m$ Fig. 3) parallel with the plane ($h$—$h$, Fig. 3) containing the axis of the blank and operates upon the blank on an arc extending through a plane ($m$—$m$, Fig. 3) parallel with the plane containing the axis of the blank; thereby producing in the blank a spiral groove which varies in depth and pitch as indicated in Figs. 3 and 4 and 6.

I do not herein claim the apparatus, the apparatus being claimed in my companion application Serial No. 702,067, filed March 26, 1924.

I claim:

1. The herein described method of producing an actuating member having a varying spiral groove; consisting in (1) mounting a cylindrical blank for rotation on its longitudinal axis opposite a cutter whose axis is perpendicular to a plane containing the axis of the blank; (2) rotating the cutter to cut the blank; and (3) producing during this cutting operation such a variable ratio of relative movement between the cutter and the blank that the cutter operates on the blank on an arc which arc lies in a plane parallel to the plane containing the axis of the blank and traverses such arc with varying speed of lateral movement thereby producing a varying spiral groove in the blank.

2. The herein described method of producing an actuating member having a varying spiral groove; consisting in (1) mounting a cylindrical blank for rotation on its axis opposite a cutter whose axis is perpendicular to a plane containing the axis of the blank; (2) entering the cutter into the blank; and (3) simultaneously rotating the cutter and the blank to cut the blank and during this cutting operation relatively moving the blank and cutter so that the cutter operates on the blank on an arc in a plane perpendicular to the axis of the cutter and parallel with the longitudinal axis of the blank and traverses such arc with varying speed, said arc intersecting some plane perpendicular to the plane containing the axis of the blank thereby producing a varying spiral groove in the blank.

3. The herein described method of producing an actuating member having a varying spiral groove; consisting in (1) mounting a cylindrical blank so that it may be revolved on its axis opposite a cutter, the axis of which is perpendicular to a plane containing the axis of the blank; (2) producing a variable ratio of relative movement between the blank and the cutter whereby the cutter always lies in some plane parallel to the said plane containing the axis of the blank so that this relative movement produces an arc with respect to the axis of the blank, the cutter traversing said arc with varying speed; (3) rotating the cutter and decreasing the distance between the cutter and the blank whereby the cutter is caused to sink into the blank; and (4) simultaneously rotating the blank into which the rotating cutter has been sunk and producing the described relative movement of the blank and cutter thereby producing in the blank a spiral groove of varying pitch and varying depth.

4. The herein described method of producing an actuating member having a varying spiral groove; consisting in (1) mounting a cylindrical blank for rotation on its longitudinal axis opposite a cutter whose axis is perpendicular to a plane containing the axis of the blank; (2) entering the cutter into the blank; and (3) simultaneously rotating the cutter and the blank and during this cutting operation relatively moving the blank and cutter so that the cutter operates on the blank on an arc in a plane perpendicular to the axis of the cutter and parallel with the longitudinal axis of the blank, the cutter traversing said arc with varying speed, said arc intersecting a plane containing the axial line of the blank and perpendicular to the plane of the arc, thereby producing a varying spiral groove in the blank.

5. The herein described method of producing an actuating member having a varying spiral groove; consisting in (1) making a cylindrical blank; (2) mounting such blank for rotation on its longitudinal axis opposite a cutter whose axis is perpendicular to a plane containing the axis of the blank; (3) introducing the cutter into the blank and rotating the cutter on its axis to cut the blank; and (4) producing during this cutting operation such relative movement between the cutter and the blank that the cutter while traversing a plane parallel with the axis of the blank operates upon the blank on an arc extending through a plane parallel with the plane containing the axis of the blank, the cutter traversing said arc with varying speed, thereby producing in the blank a spiral groove which is deepest intermediate each end and its center, and which increases in pitch from the center toward each end thereof.

6. The herein described method of producing a spirally grooved actuating member, consisting in mounting a blank for rotation on its axis, mounting a rotatable cutter in a plane substantially perpendicular to a plane containing the axis of the blank; and rotating the cutter and producing during the cutting operation a movement of the cutter on an arc relative to the blank so that said cutter in traversing such arc intersects at two points a plane extending through the axis of the blank and substantially perpendicular to the plane of the arc.

7. The herein described method of producing a spirally grooved actuating member; consisting in mounting a blank for rotation on its axis; mounting a cutter in a plane substantially perpendicular to a plane containing the axis of the blank, rotating the cutter and entering the cutter into the blank, then producing an arcuate movement of the cutter relative to the blank and causing said cutter in traversing such arc to intersect at two points a plane extending through the axis of the blank and approximately perpendicular to the plane of the arc.

8. The herein described method of producing an actuating member having a varying spiral groove; consisting in mounting a cylinderical blank for rotation on its longitudinal axis; so arranging a rotatable cutter that its axis is perpendicular to a plane containing the axis of the blank; and then moving the cutter during the cutting operation on an arc which intersects at two points a plane extending through the axis of the blank and perpendicular to the plane of the arc.

9. The herein described method of cutting a spiral groove, consisting in mounting a cylindrical blank for rotation on its longitudinal axis opposite a cutter whose axis is perpendicular to a plane containing the axis of the blank; rotating the cutter on its axis to cut the blank; and producing during this cutting operation such a variable ratio of relative movement of the cutter and the blank that the cutter traverses an arc relative to the blank, thereby producing a spiral groove gradually varying in pitch from the center toward each end thereof.

10. The herein described method of producing a spirally grooved member, consisting in (1) mounting a cylindrical blank for rotation on its longitudinal axis opposite a cutter whose axis is perpendicular to a plane containing the axis of the blank; (2) entering the cutter into the blank; (3) then rotating the cutter on its axis to cut the blank; and (4) producing during this cutting operation such a variable ratio of relative movements of the cutter and the blank that the cutter traverses an arc relative to the blank with varying speed thereby producing a spiral groove gradually varying in pitch from the center toward each end thereof.

11. The herein described method of cutting a spiral grove, consisting in mounting a cylindrical blank for rotation on its longitudinal axis opposite a cutter whose axis is perpendicular to a plane containing the axis of the blank, rotating the cutter on its axis to cut the blank; and producing during this cutting operation such movements of the cutter and the blank that the cutter traverses an arc relative to the blank and in so doing intersects at two points a plane extending through the axis of the blank and perpendicular to the plane of the arc thereby producing a spiral groove varying in pitch from the center toward each end thereof.

12. The herein described method of producing a spirally grooved member, consisting in (1) mounting a cylindrical blank for rotation on its longitudinal axis opposite a cutter whose axis is perpendicular to a plane containing the axis of the blank; (2) entering the cutter into the blank; (3) then rotating the cutter on its axis to cut the blank; and (4) producing during this cutting operation such movements of the cutter and the blank that the cutter traverses an arc relative to the blank and in so doing intersects at two points a plane extending through the axis of the blank and perpendicular to the plane of the arc, thereby producing a spiral groove gradually varying in pitch from the center toward each end thereof.

In testimony that I claim the foregoing as my own I affix my signature.

DAVID E. ROSS.